Patented Feb. 2, 1943

2,309,727

UNITED STATES PATENT OFFICE 2,309,727

FURYL VINYL KETONE AND ITS ALPHA ALKYL SUBSTITUTED VINYL ANALOGUES

Carl E. Barnes, Worcester, Mass., assignor, by mesne assignments, to E. I. du Pont de Nemours & Company, Wilmington, Del., a corporation of Delaware No Drawing. Application December 6, 1938, Serial No. 244,219

3 Claims. (Cl. 260—66)

This invention relates to polymerizable vinyl ketones and more particularly to monomeric and polymeric substances comprising the same.

Synthetic resins are made by polymerization of various compounds containing the unsaturated group

(R being hydrogen, alkyl, halogen, etc.), in which the bonds are considered to rearrange themselves to form a linear chain having the group

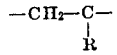

as a repeating unit. These linear compounds have the properties of fusibility and solubility. As set forth in my copending application Serial No. 240,529 filed November 15, 1938, vinyl methyl ketone and isopropenyl methyl ketone contain a polymerizable unsaturated methylene group capable of polymerization by a rearrangement of the bonds in such a way as to form a linear chain having the group

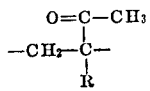

as a repeating unit in which R is H or $CH_3$.

I have now found that useful polymerizable substances may be made from unsaturated furyl ketones having the general formula

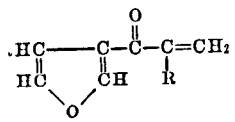

in which R may be hydrogen or methyl. Resins that are useful as shaped articles or as bonds for granular material may be made by polymerizing furyl vinyl ketone or its alpha methyl substituted vinyl analogue, that is to say, furyl vinyl ketone and furyl isopropenyl ketone.

The primary object of this invention is to provide monomeric and polymeric substances comprising furyl vinyl ketone and furyl isopropenyl ketone.

A further object is to copolymerize these substances with other modifying agents capable of forming useful interpolymers having a required degree of hardness, fusibility, solubility, refractive index or other desired characteristics.

Further objects are to provide such polymers and copolymers for use in the manufacture of molded articles and bodies of granular material, such as abrasive grain. Further objects will be apparent in the following disclosure.

Furyl vinyl ketone may be made by treating furyl methyl ketone with formaldehyde in the presence of potassium carbonate or other suitable alkaline material, and thereafter dehydrating the product with iodine in the presence of calcium carbonate or other suitable alkaline agent capable of neutralizing any acid formed and preventing decomposition of the final product thereby. Similarly, furyl ethyl ketone may be treated with formaldehyde with subsequent dehydration to form isopropenyl ketone (furyl methyl vinyl ketone). The reactions may be expressed by the following equation

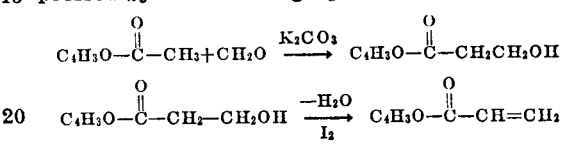

By substituting furyl ethyl ketone in the above reaction, the product will be furyl isopropenyl ketone. These ketones may also be prepared by treating the furyl ketone with formaldehyde in the presence of an alkyl ammonium salt, such as dimethyl ammonium chloride, the reaction thought to be as follows:

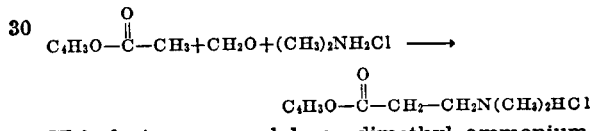

This last compound loses dimethyl ammonium chloride with the formation of furyl vinyl ketone:

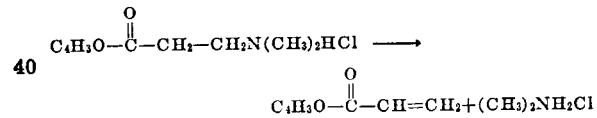

Furyl vinyl ketone boils at 85° C./10 mm. while furyl isopropenyl ketone boils at 92° C./10 mm.

These substances as thus produced are substantially transparent liquids which polymerize under standard polymerizing conditions to form transparent solid bodies which are linear polymers having a high refractive index. These substances may be used with base substances forming copolymers therewith. Suitable cross linking agents may be used, such as a compound with two or more polymerizable unsaturated methylene groups in the same molecule. During the polymerization the growing chains incorporate molecules of both substances forming a three dimensional structure. The number of linkages between the linear chains vary with the amount of the cross linking agent used, hence compounds of various degrees of hardness and solubility may be produced by changing the proportions.

I, therefore, propose to modify the characteristics of furyl vinyl ketone and furyl isopropenyl ketone by copolymerizing therewith a suitable modifying agent which will serve either as a cross linking agent, as above indicated, or which may act as a hardness improving agent because of other properties thereof. For example, acrylic acid, methacrylic acid and similar acids act as hardening agents without forming cross linkages. Examples of cross linking agents are the polyhydric alcohol esters of acrylic and methacrylic acids, and the anhydrides, and vinyl and allyl esters of these acids. Examples of the polyhydric alcohols are the hypothetical ethylidene glycol, ethylene glycol, glycerol, pentaglycerol, and various other polyhydric alcohols capable of forming esters with these acids and their homologues. Other desirable cross linking agents are di-vinyl ketone and its homologues.

I may also use a modifying agent which improves the hardness characteristics of the body due to the presence of polar substituents, such as carboxyl groups. For example, acrylic acid, methacrylic acid and other alpha alkyl substituted acrylic acids are believed to act as if the carboxyl groups in adjacent chains attract each other, thus raising the softening point and increasing the hardness of the copolymer.

It will also be appreciated that I may modify other characteristics of the copolymer by the addition of a third polymerizable substance. For example, besides adding the hardness improving agent, I may vary the refractive index of the base substance by means of styrene, which has the high index of refraction of 1.5916. Other high index agents are the acrylic and methacrylic acid esters of the hydroxyquinolines, the hydroxydiphenyls, the nitrophenols and the chlorophenols. Other suitable agents are nitroethylene, triphenylmethyl acrylate or methacrylate, and ortho-, meta-, or para-nitrostyrene. Vinyl chloride and acetate have low indices and are useful. The index of refraction of such a triple interpolymer is proportional to the amount of the index modifying agent used and will range between the end values of the substances employed. Furyl vinyl ketone and furyl isopropenyl ketone have high indices of refraction, and these substances may therefore be used to modify the refractive index of other polymerizable substances and copolymers containing the same.

In accordance with this phase of my invention, I may employ furyl vinyl ketone and furyl isopropenyl ketone as a base substance and impart hardness or other desired characteristics thereto by mixing the monomer with a suitable amount of a monomeric cross linking agent, such as divinyl ketones. Also, I may give the copolymer a desired refractive index by adding the right proportion of a suitable monomeric modifying agent and then polymerizing the mixture. In order to obtain a product which is substantially infusible I may use a large proportion of divinyl ketone or any other of the cross linking agents above specified such as from 10 to 20% thereof. Such a body may be cast in shape and then have its surface finished by a grinding operation if it is to be used as an optical lens or for other desired purposes. It is possible to obtain a product of intermediate characteristics as regards hardness or softening point. For example, I may make a copolymerized resin which is moldable under heat and pressure and may, therefore, be used for making an optical lens by shaping the mass in a mold. For a hard molding resin, I may, for example, employ a polar hardening agent, such as methacrylic acid, in concentrations of from 5 to 30%, depending upon the miscibility and the amount of hardness desired.

A copolymer of the selected vinyl ketone and modifying agent may be used for various molding purposes to make shaped articles, or it may be used for bonding granular material, such as abrasive grains; and in such cases the proportion of the modifying agent employed may be governed by the requirement of the final product. If abrasive grains, such as crystalline alumina, silicon carbide, boron carbide or diamonds, are to be bonded by the interpolymer, the mixture of chosen monomeric substances may be incorporated with the grains in desired proportions and the bond polymerized by heat, with or without the aid of catalysts, such as benzoyl peroxide. Suitable procedure may be adopted for making such bonded articles in accordance with the methods set forth in the applications of Kistler and Barnes Serial No. 187,549 filed January 28, 1938, now U. S. Patent No. 2,218,795, and Serial No. 228,004 filed September 1, 1938, now U. S. Patent No. 2,256,618. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, if the proportions of the base substance and modifying agent permit the substance to be softened by heat materially, then one may make the bond as a granular substance which may be mixed with the abrasive grains, together with a plasticizing medium, such as any suitable solvent which includes monomeric polymerizable liquids. Then the mixture of grains and bond may be shaped in a mold with sufficient heat and pressure to cause the bond to soften and adhere to the grains. Other suitable procedures as set forth in said applications may be employed with the base substance and the modifying agents herein disclosed, and this invention is deemed to cover the products thus made.

It will now be appreciated, in view of the above explanation, that one or more of furyl vinyl ketone and furyl isopropenyl ketone may be used by themselves as polymerizable compounds to make desired articles of commerce or they may be copolymerized with various cross linking agents or other base substances as required. Also, it is to be understood that while I have attempted to explain this invention in the light of the present accepted theories, yet the claims are not to be construed as dependent on any particular theory relative to the formation of these copolymers. Also, the examples above given are to be interpreted solely as illustrating the invention and not as limitations thereon, except as set forth in the claims appended hereto.

I claim:

1. Method of making a compound from the group consisting of furyl vinyl ketone and furyl isopropenyl ketone, comprising the steps of treating a ketone from the group consisting of furyl methyl ketone and furyl ethyl ketone, with formaldehyde in the presence of a dialkyl ammonium salt and thereafter steam distilling the product.

2. Method of making a compound from the group consisting of furyl vinyl ketone and furyl isopropenyl ketone, comprising the steps of treating a ketone from the group consisting of furyl methyl ketone and furyl ethyl ketone, with formaldehyde in the presence of dimethyl ammonium chloride and thereafter steam distilling the product.

3. A resinous copolymer comprising a compound from the group consisting of furyl vinyl ketone and furyl isopropenyl ketone, copolymerized with a hardening agent from the group consisting of the polyhydric alcohol esters of acrylic and methacrylic acids.

CARL E. BARNES.